US010624126B2

(12) United States Patent
Novlan et al.

(10) Patent No.: US 10,624,126 B2
(45) Date of Patent: Apr. 14, 2020

(54) CLOSE LOOP LISTEN BEFORE TALK TO NR OPERATION IN UNLICENSED SPECTRUM

(71) Applicant: AT&T INTELLECTUAL PROPERTY I, L.P., Atlanta, GA (US)

(72) Inventors: Thomas Novlan, Austin, TX (US); Arunabha Ghosh, Austin, TX (US); Abdulrauf Hafeez, Cary, NC (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/932,316

(22) Filed: Feb. 16, 2018

(65) Prior Publication Data
US 2019/0261412 A1    Aug. 22, 2019

(51) Int. Cl.
*H04W 74/08* (2009.01)
*H04W 16/14* (2009.01)
(Continued)

(52) U.S. Cl.
CPC ....... *H04W 74/0808* (2013.01); *H04W 16/14* (2013.01); *H04W 72/042* (2013.01); *H04W 72/0413* (2013.01); *H04W 74/006* (2013.01)

(58) Field of Classification Search
CPC . H04W 16/14; H04W 72/082; H04W 56/001; H04W 74/0808; H04W 74/0816; H04B 1/1027; H04B 17/345
See application file for complete search history.

(56) References Cited

U.S. PATENT DOCUMENTS 7,995,604 B2    8/2011  Rofougaran
8,274,961 B2    9/2012  Sakoda et al.
(Continued)

FOREIGN PATENT DOCUMENTS

GB         2549967 A      8/2017
WO    2015/185989 A2    12/2015
(Continued)

OTHER PUBLICATIONS

Chen, "Dynamic Spectrum Access in Cognitive Radio Networks: Optimization of Sensing-Transmission Scheme with Variable Packet Length." University of California, Davis, pp. 1-15 (2010). 15 pages.
(Continued)

*Primary Examiner* — Marsha D Banks Harold
*Assistant Examiner* — Elton Williams
(74) *Attorney, Agent, or Firm* — Amin, Turocy & Watson, LLP

(57) ABSTRACT

Various embodiments disclosed herein provide for a closed loop Listen Before Talk (LBT) which is a coexistence mechanism used by wireless technologies such as Wi-Fi, to access unlicensed shared spectrum, such as the ISM UNII bands (5 GHz). The embodiments disclosed herein enable a base station to coordinate the LBT process at both the base station and a receiver in order to avoid hidden node interference where the interfering nodes are outside the sensing range of the transmitting node. The base station device can send a LBT trigger to the receiver to synchronize the clear channel assessments that are performed at each device to determine if there is any activity on the channel. The receiving device can send back a report to the base station device, and if no activity on the channel is detected, the base station device can schedule a transmission on the channel.

20 Claims, 10 Drawing Sheets

(51) Int. Cl.
*H04W 72/04* (2009.01)
*H04W 74/00* (2009.01)

(56) References Cited

U.S. PATENT DOCUMENTS

| | | | |
|---|---|---|---|
| 8,428,041 | B2 | 4/2013 | Sakoda et al. |
| 8,472,467 | B2 | 6/2013 | Oyman et al. |
| 8,693,414 | B2 | 4/2014 | Wu et al. |
| 8,958,307 | B2 | 2/2015 | Xue et al. |
| 9,173,191 | B2 | 10/2015 | Gong et al. |
| 9,380,577 | B2 | 6/2016 | Nezou et al. |
| 9,730,105 | B2 | 8/2017 | Bhushan et al. |
| 9,980,289 | B2 | 5/2018 | Wu et al. |
| 2014/0247774 | A1 | 9/2014 | Zhou et al. |
| 2014/0341018 | A1 | 11/2014 | Bhushan et al. |
| 2015/0296413 | A1* | 10/2015 | Sadek ............... H04B 1/1027 375/348 |
| 2015/0312793 | A1* | 10/2015 | Jeon ................ H04W 28/0205 370/329 |
| 2016/0066195 | A1 | 3/2016 | Moon et al. |
| 2016/0165574 | A1 | 6/2016 | Chu et al. |
| 2017/0135130 | A1 | 5/2017 | Seok |
| 2017/0142754 | A1* | 5/2017 | Uziel ........................ H04L 1/16 |
| 2017/0223677 | A1 | 8/2017 | Dinan et al. |
| 2017/0223739 | A1 | 8/2017 | Mallik et al. |
| 2017/0332338 | A1* | 11/2017 | Mallik ................. H04W 48/10 |
| 2018/0020478 | A1 | 1/2018 | Derham et al. |
| 2018/0063799 | A1 | 3/2018 | Sadek et al. |
| 2018/0091980 | A1 | 3/2018 | Sun et al. |
| 2018/0115996 | A1* | 4/2018 | Si ..................... H04W 74/0816 |
| 2018/0220458 | A1* | 8/2018 | Ouchi ..................... H04J 11/00 |
| 2018/0234980 | A1 | 8/2018 | Li et al. |
| 2018/0249380 | A1 | 8/2018 | Zhang et al. |
| 2019/0150088 | A1 | 5/2019 | Sun et al. |
| 2019/0166621 | A1* | 5/2019 | Yerramalli ............ H04W 16/14 |

FOREIGN PATENT DOCUMENTS

| | | |
|---|---|---|
| WO | 2017050364 | 3/2017 |
| WO | 2017080572 | 5/2017 |
| WO | 2017114552 | 7/2017 |
| WO | 2017120542 | 7/2017 |
| WO | 2017136458 | 8/2017 |
| WO | 2017167746 | 10/2017 |
| WO | 2017172829 | 10/2017 |
| WO | 2017178486 | 10/2017 |
| WO | 2017196329 | 11/2017 |
| WO | 2017197296 | 11/2017 |
| WO | 2017212456 | 12/2017 |
| WO | 2018026410 | 2/2018 |
| WO | 2018028838 | 2/2018 |
| WO | 2018029654 | 2/2018 |
| WO | 2018029659 | 2/2018 |

OTHER PUBLICATIONS

Huang, et al. "Short paper: On Optimal Sensing and Transmission Strategies for Dynamic Spectrum Access." New Frontiers in Dynamic Spectrum Access Networks, DySPAN 2008, 3rd IEEE Symposium, IEEE, pp. 1-5 (2008). 5 pages.

Liao, et al. "Full Duplex Cognitive Radio: A New Design Paradigm for Enhancing Spectrum Usage." IEEE Communications Magazine 53.5, pp. 138-145 (2015). 18 pages.

Leu, et al., "Modeling and analysis of interference in Listen-Before-Talk spectrum access schemes." International Journal of Network Management 16.2, pp. 131-147 (2006). 17 pages.

Liao, et al., "Listen- and-Talk: Full-Duplex Cognitive Radio Networks." Global Communications Conference (GLOBECOM), IEEE, pp. 1-6 (2014). 6 pages.

Kim, et al., "Adaptive Listen-Before-Talk (LBT) Scheme for LTE and Wi-Fi Systems Coexisting in Unlicensed Band " Consumer Communications & Networking Conference (CCNC), 2016 13th IEEE Annual, IEEE, pp. 1-6 (2016). 6 pages.

Sadek, et al., "Listen-Before-Talk Versus Treating Interference as Noise for Spectrum Sharing." New Frontiers in Dynamic Spectrum Access Networks, DySPAN 2008, 3rd IEEE Symposium, IEEE, pp. 1-6 (2008). 6 pages.

International Search Report and Written Opinion received for PCT Application Serial No. PCT/US2019/017306 dated Apr. 25, 2019, 18 pages.

ZTE, "Channel sensing based schemes for cross-link interference mitigation in NR", 3GPP TSG RAN WG1 Meeting #90, R1-1712282, 6.1.5.2, Aug. 21-25, 2017, pp. 1-8.

ZTE, "Channel sensing based scheme for cross-link interference mitigation in NR", 3GPP TSG RAN WG1 Meeting #88, R1-1701617, 8.1.6.3, Feb. 13-17, 2017, pp. 1-10.

ZTE, "Channel sensing based scheme for CLI mitigation in NR", 3GPP TSG RAN WG1 Meeting #88bis, R1-1704435, 8.1.6.1, Apr. 3-7, 2017, pp. 1-7.

Non-Final Office Action received for U.S. Appl. No. 16/138,132 dated Oct. 17, 2019, 34 pages.

Final Office Action received for U.S. Appl. No. 16/138,132 dated Jan. 30, 2020, 21 pages.

* cited by examiner

CLOSE LOOP LISTEN BEFORE TALK TO NR OPERATION IN UNLICENSED SPECTRUM

TECHNICAL FIELD

The present application relates generally to the field of mobile communication and, more specifically, to implementing close loop Listen Before Talk (LBT), a radio frequency coexistence mechanism for a wireless communications transmission in a next generation wireless communications network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
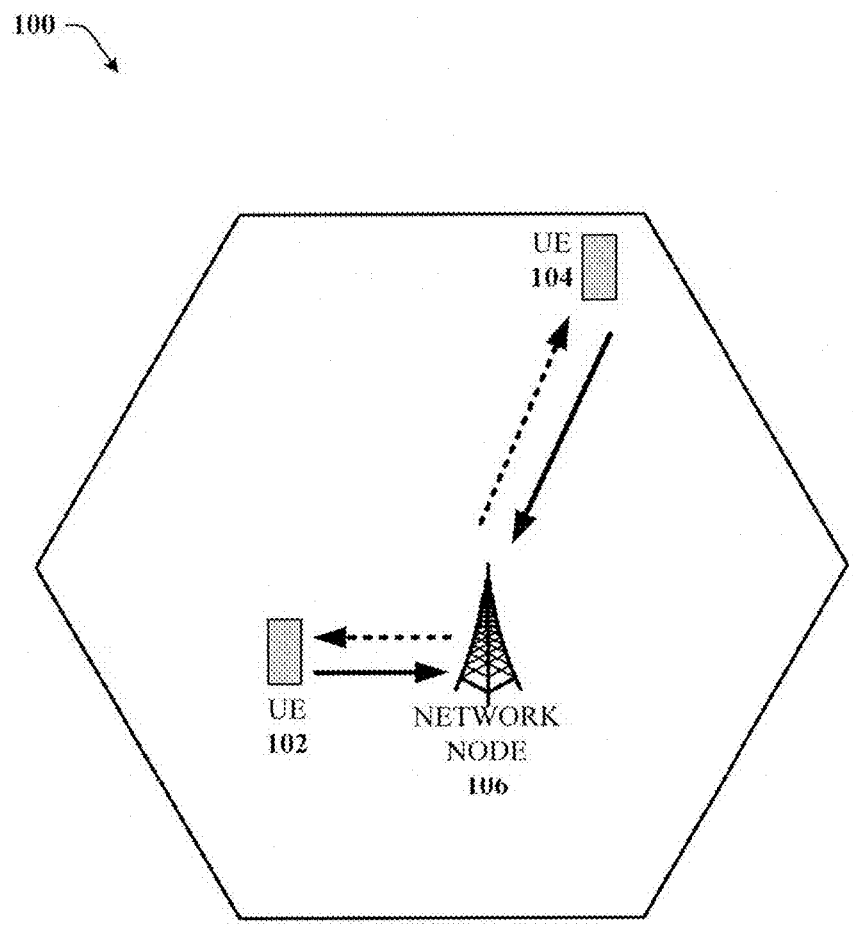
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for a closed loop Listen Before Talk (LBT) which is a coexistence mechanism used by wireless technologies such as Wi-Fi, to access unlicensed shared spectrum, such as the ISM UNII bands (5 GHz). The embodiments disclosed herein enable a base station to coordinate the LBT process at both the base station and a receiver in order to avoid hidden node interference where the interfering nodes are outside the sensing range of the transmitting node. The base station device can send a LBT trigger to the receiver to synchronize the clear channel assessments that are performed at each device to determine if there is any activity on the channel. The receiving device can then send back a report to the base station device, and if both devices detect no activity on the channel, the base station device can schedule a transmission on the channel.

While reference is generally made throughout the disclosure to a downlink communication, in other embodiments, the principles disclosed herein can apply to uplink transmissions as well. In both cases however, the base station device can initiate the LBT trigger in order to synchronize and otherwise align the clear channel assessments performed at the mobile device and the base station device.

While reference is generally made throughout the disclosure to alignment of LBT at the transmit node(s) and receive node(s), the principle disclosed herein applies to performing LBT on transmit node(s) only, receive node(s) only, or a subset of transmit and receive node(s).

Also the LBT used by New Radio (NR) (e.g., 5G) on unlicensed carriers should have features and functionality that allow it to maximize the frequency reuse especially when operating under light load or sparse deployment. When the load is low or the deployment is sparse the likelihood of collisions is low. Therefore, the LBT mechanism of NR unlicensed may adapt to such conditions and be utilized when needed. For example, the network on the licensed carrier may semi-statically (e.g. via radio resource control message) or dynamically (e.g. via downlink control information) determine whether or not to perform LBT at the transmit node(s), receiving node(s), or both.

In various embodiments, a base station device can comprise a processor and a memory that stores executable instructions that, when executed by the processor facilitate performance of operations. The operations can comprise facilitating transmitting a first listen before talk trigger to a first mobile device via a downlink control channel, the first listen before talk trigger comprising an instruction to the first mobile device to perform a first clear channel assessment of a channel at a defined time. The operations can also comprise performing a second clear channel assessment of the channel at the defined time. The operations can also comprise receiving a first result of the first clear channel assessment from the first mobile device via an uplink control channel. The operations can also comprise in response to the first result of the first clear channel assessment and a second result of the second clear channel assessment indicating that the channel is clear, scheduling a first transmission to the first mobile device via the channel.

In another embodiment, method comprises facilitating, by a base station device comprising a processor, transmitting a request for a first clear channel assessment to a first user equipment device via a downlink control channel, the request comprising an instruction to the first user equipment device to perform the first clear channel assessment on a frequency band at a predetermined time. The method can also comprise performing, by the base station device, a second clear channel assessment on the frequency band at the predetermined time. The method can also comprise performing, by the base station device, a second clear channel assessment on the frequency band at the predetermined time. The method can also comprise in response to the first result of the first clear channel assessment and a second result of the second clear channel assessment indicating that the frequency band is clear, scheduling, by the base station device, a first transmission to the first user equipment device on the frequency band.

In another embodiment machine-readable storage medium, comprising executable instructions that, when executed by a processor of a device, facilitate performance of operations. The operations can comprise transmitting a first listen before talk trigger to a first mobile device via a downlink control channel, the first listen before talk trigger comprising an instruction to the first mobile device to perform a first clear channel assessment of a channel at a defined time. The operations can also comprise performing a second clear channel assessment of the channel at the defined time. The operations can also comprise receiving a result of the first clear channel assessment from the first mobile device via an uplink control channel. The operations can also comprise in response to the first clear channel assessment and the second clear channel assessment having determined that the channel is clear, scheduling a first transmission to the first mobile device via the channel.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, network node 106 or UE 102 and UE 104 can perform clear channel assessments (CCA) on channels to avoid sending a transmission on a beam that already has activity on the channel In an embodiment, the network node 106 can send a LBT trigger to the UE 104 and/or the UE 102 in order to coordinate the LBT process which comprises a clear channel assessment and then reporting the results of the clear channel assessment back to the network node 106. If the network node determines that there is no activity on the channel at both the transmitter and receiver side, the network node 106 can schedule a transmission on the channel.

Listen Before Talk (LBT) is a coexistence mechanism used by wireless technologies, such as Wi-Fi, to access unlicensed shared spectrum, such as the ISM UNII (Unlicensed National Information Infrastructure) bands (5 GHz). A form of LBT is required by regulation in some countries and regions, such as Europe and Japan. In the US although LBT is not required by regulation, it is used by Wi-Fi and LTE License Assisted Access (LAA) for coexistence purposes. In an embodiment, in LAA, the data channel can use the unlicensed channel for improved throughput, but the control signaling can be performed using the licensed carriers for improved robustness and low latency since those resources are dedicated for the operator and not subject to coexistence requirements. However the data channel, on which the LBT is being performed can be an unlicensed carrier that is typically used for offloading data transmissions from the licensed carriers due to the large available bandwidth.

As part of the LBT procedure the devices perform spectrum sensing also known as Clear Channel Assessment (CCA), where multiple time/frequency slots are measured with respect to a configured energy detection (ED) threshold. While LBT performed independently at a transmitting node can be used to avoid collisions of transmissions at a target receiver, the performance may suffer from so-called "hidden node problems" if the interfering transmitting nodes are outside the sensing range of the transmitting node. Due to the challenges of hidden nodes and associated latency incurred by LBT procedures on unlicensed carriers, it is beneficial to utilize the licensed (NR-L) and unlicensed (NR-U) carriers in LAA deployments jointly to perform LBT procedures. This invention describes methods for utilizing the licensed carrier to provide LBT configuration, feedback, and coordination in networks utilizing LAA.

In one or more embodiments, NR ("New Radio" e.g., 5G) may operate in sub 6 GHz or above 6 GHz spectrum, including licensed and unlicensed spectrum. Especially in higher frequency bands, the performance of LBT may be improved significantly with transmit and receive beamforming. 5G systems, especially for mmWave spectrum, will have a large number of antenna elements which could be used for analog, digital or hybrid beamforming. With Time Division Duplex (TDD) transmission, every transmit beam has a corresponding receive beam with identical characteristics. Using this property a transceiver can sense during LBT if other users are active on some beams but not on other beams. This allows the transceiver to use the inactive beams for its transmissions, thus increasing channel reuse efficiency without causing interference.

Closed loop LBT can be beneficial in combination with multi-beam LBT by aggregating the CCA results for multiple groups of Tx/Rx beam pairs for a given device. The LBT trigger may include an indication to perform channel sensing on one or more beam pair links (BPL) corresponding to different combinations of Tx/Rx beams. This can include quasi-co-location (QCL) information for each BPL associated with a given set of LBT parameters. The QCL information may include indication that for a given BPL a set of RS/transmissions may be assumed by the UE to be quasi-co-located (e.g. identical geographically) with respect to Doppler spread, Doppler shift, average gain, average delay, and spatial Rx parameters The LBT trigger may be independently sent for each BPL or may be provided once for a set of BPLs.

Closed Loop LBT Feedback can also be sent from a UE corresponding to one or more configured BPLs that the UE utilized when performing channel sensing. The network may determine which subset of BPLs to use for a given UE based on whether LBT is successful and whether it can pair other UEs or multiple spatial layers. In this case synchronization of LBT at the transmitter and receiver refers to the same time as well on the same beam pair links. In one example the UE performs the LBT across multiple BPLs independently and sequentially. In another example, if a UE is capable of supporting multiple BPLs the LBT feedback can also be used to enable transmissions from multiple transmission or reception points (TRPs) in a given cell by synchronizing the LBT of multiple BPLs from different TRPs simultaneously. In one example the LBT triggers may be sent via multiple DCIs for each TRP or may be sent by a common DCI. In another example the LBT feedback may be sent via multiple UL messages or may be sent via common messages which group the BPLs or subsets of BPLs.

Closed-loop LBT can be utilized in the case where multiple NR-U carriers or bandwidth parts (BWPs) are utilized. In this case the LBT trigger may indicate a set of carriers/BWP for performing synchronized LBT either independently or jointly. The trigger may also indicate a priority or time pattern for performing LBT across the multiple carriers/BWPs in case the UE is not capable of performing simultaneous LBT across them.

Figure 2:
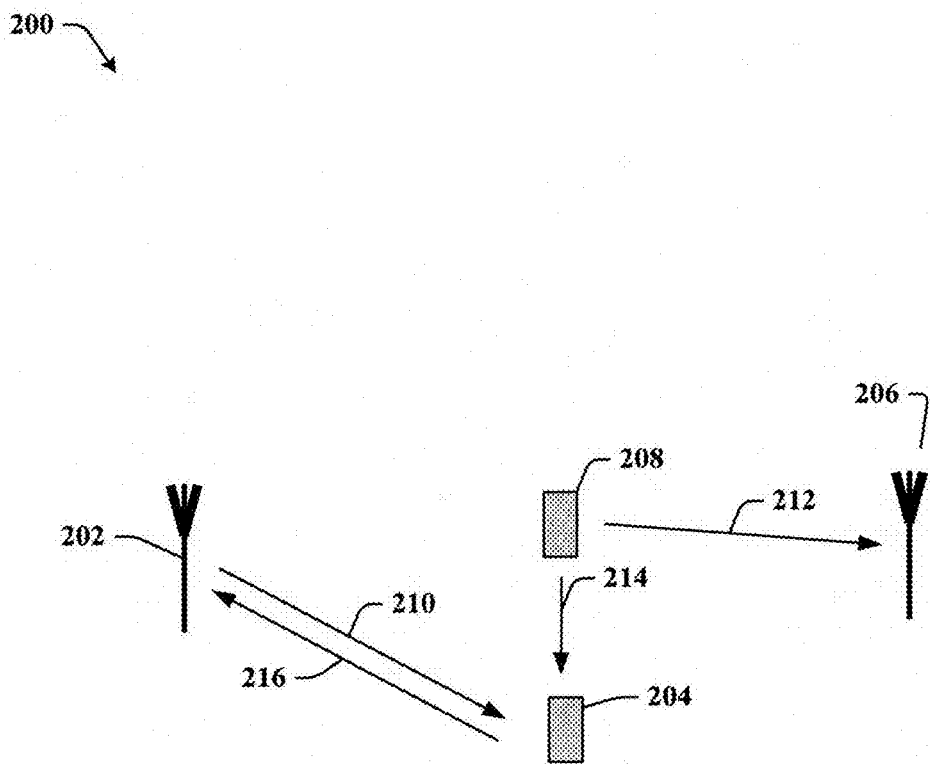
FIG. 2 illustrates an example block diagram showing a closed loop listen before talk system in accordance with various aspects and embodiments of the subject disclosure.

In addition, the LBT feedback messages may include the carrier sensing status of multiple carriers in the same message or different feedback messages for each carrier. Closed-Loop LBT can be used in case of contiguous and non-contiguous operation of multiple carriers/BWPs Turning now to FIG. 2, illustrated is an example block diagram 200 showing a closed loop listen before talk system in accordance with various aspects and embodiments of the subject disclosure.

In an embodiment, a base station device 202 can send a LBT trigger 210 to mobile device 204 in order to facilitate scheduling an uplink or downlink transmission from or to the mobile device 204. The trigger can coordinate the clear channel assessments (CCA) performed such that they occur at roughly the same time at both the mobile device 204 and the base station device 202. If the CCA performed at the mobile device 204 and the base station device 202 is clear (e.g., no activity on the unlicensed channel/frequency band is detected) then the mobile device 204 can send back a report 216 to the base station device indicating the results, and the base station device 202 can initiate scheduling of the transmission. If on the other hand, the CCA performed at the mobile device 204 detects a transmission (e.g., transmission 214) from mobile device 208 that is part of a transmission 212 to base station device 206, then the mobile device 204 can determine that there is activity on the channel, and inform the base station device 202 about the activity. Base station device 202 can then wait a predetermined period of time or send a second LBT trigger to see if there continues to be activity on the channel at a later time.

In an embodiment, the LBT trigger can be sent on a downlink control channel (e.g., PDCCH or PDSCH), or on a new dedicated physical channel. The trigger can include a request to perform the clear channel assessment as well as providing parameters indicating how the mobile device 204 should perform the CCA. The indicated LBT parameters may include a starting time location/offset for carrier sensing as well as a duration in symbols/slots, energy detection threshold, LBT type, priority, etc. Upon receiving the LBT trigger at the mobile device 204, the base station device 202 and mobile device 204 can perform synchronized LBT. The LBT trigger downlink channel information (DCI) may or may not require an acknowledgement message from the UE. By utilizing the licensed carrier associated with channels 210 and 216, the LBT procedure can become more robust with lower latency/overhead than techniques which can only utilized unlicensed spectrum.

After performing LBT the mobile device 204 can feedback the channel sensing status to the gNB which then can utilize the feedback to determine whether the channel is clear at both ends of the link. The LBT feedback is carried on the licensed carrier (NR-L) carrier in the form of an uplink control message, e.g. on PUCCH or PUSCH or on a new dedicated physical channel for indicating the result of the carrier sensing. In addition the LBT feedback can be included or carried in a "piggyback" fashion on other control channel messages or feedback such as HARQ ACK/NACK, CSI or beam management reports, UL data transmissions, or UL scheduling requests/buffer status reports.

The LBT feedback message may contain information such as clear channel assessment status on a per-symbol or per LBT duration. In one example the LBT feedback of the channel status for a LBT occasion on a given link can be indicated as a 1-*bit* message (e.g. clear/not clear). In another example the LBT feedback may include additional information regarding the identities and/or measurements such as channel occupancy indication (time/frequency/spatial occupancy) and RSRP/RSSI measurement(s) of detected potentially interfering transmitters.

In one example the LBT feedback is provided in the uplink portion of a self-contained subframe/slot, whether the LBT trigger is carried in the downlink portion of the same subframe/slot. In another example the LBT trigger and/or feedback may be carried on mini-slots within the duration of a slot. This is beneficial to reduce the delay between LBT trigger and feedback in case the LBT duration is short. In case of longer LBT durations which are more than one slot in length, the LBT trigger DCI may indicate the timing of the LBT feedback message, for example the starting slot or symbol offset. In another example the LBT feedback timing is implicitly determined based on the duration of the LBT sensing period.

LBT feedback may also be provided on the unlicensed channel. The feedback signal carries information about the intended transmitting node. This allows collision avoidance by informing other nodes in the vicinity about the impending transmission.

In addition, longer term feedback may be provided via higher layer messages on the licensed carrier for example by radio resource control (RRC) signaling. Closed-Loop LBT operation may be configured for a given UE (e.g., mobile device 204) via dedicated (RRC) or broadcast signaling (e.g. system information broadcast) messages.

Figure 3:
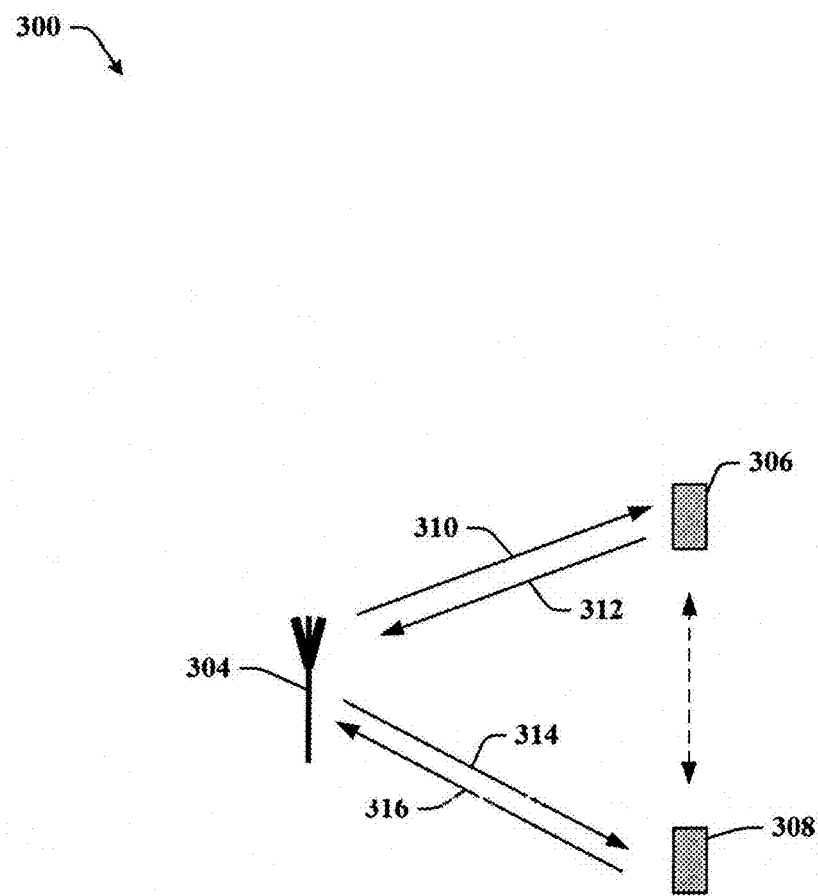
FIG. 3 illustrates an example block diagram showing a multi-user closed loop listen before talk system in accordance with various aspects and embodiments of the subject disclosure.

Turning now to FIG. 3, illustrated is an example block diagram 300 showing a multi-user closed loop listen before talk system in accordance with various aspects and embodiments of the subject disclosure.

In an embodiment, the base station device 304 can coordinate LBT between both devices 306 and 308 by sending LBT triggers 310 and 314 to the devices 306 and 308 respectively requesting CCAs to be performed at the same time. Devices 306 and 308 can then send back their reports 312 and 316 to the base station device 304 for the base station device 304 to determine whether to facilitate scheduling a transmission to either device 306 or 308. If for example, device 308 detects activity on the unlicensed channel, but device 306 and base station device 304 do not, then the base station device 304 can schedule a transmission between the base station device 304 and the mobile device 306, while sending a second LBT trigger to device 308.

Figure 4:
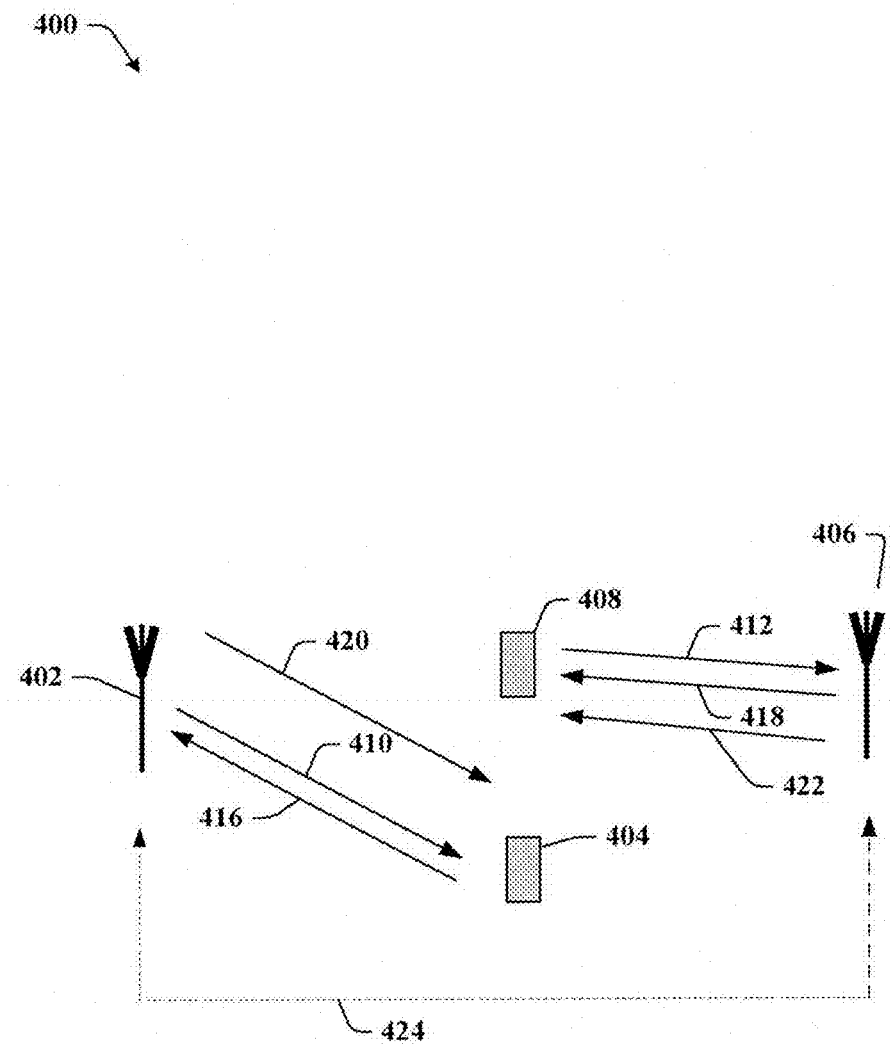
FIG. 4 illustrates an example block diagram showing a multi-cell closed loop listen before talk system in accordance with various aspects and embodiments of the subject disclosure.

The closed loop LBT can be extended to multiple UEs allowing for synchronized LBT across all of them. This is shown in FIG. 4. The gNB1 sends LBT triggers to both UE1 and UE2 which aligns their clear channel assessment (CCA) periods. When both UEs complete the sensing they send LBT feedback messages on the NR-L carrier providing the sensing result. This enables the gNB to determine which of the UEs should be scheduled based on whether the channel is clear on both ends of the gNB/UE link. In case multiple UEs indicate clear channel status, the gNB may schedule them simultaneously for example with multi-user MIMO transmissions, increasing the spectral efficiency of the NR-U carrier.

Multi-User Closed Loop LBT can be extended to support both downlink and uplink multi-user multiple input/multiple output (MU-MIMO), where the LBT trigger may be precede or be combined with a uplink data transmission grant for UEs which detect a clear channel during LBT.

Turning now to FIG. 4, illustrated is an example block diagram 400 showing a multi-cell closed loop listen before talk system in accordance with various aspects and embodiments of the subject disclosure.

In an embodiment, a base station device 402 and a base station 406 can coordinate the LBT process such each of the base stations 402 and 406 and devices 408 and 404 are aligned when performing the CCA. The base stations 402 and 406 can communicate with each other over the air, or via a backhaul network 424, and can respectively send LBT triggers 410 and 418 to the mobile devices 404 and 408. Upon receiving back CCA reports 416 and 412 from devices 404 and 408, base station devices 402 and 406 can determine whether to schedule transmission to either of devices 404 and/or 408.

Depending on whether any transmissions of other nodes were detected the base stations 402 and 406 can independently decide which of mobile devices 404 and 408 to schedule. However if the channel was detected to be clear by mobile devices of different cells, Reuse-1 transmissions 420 and 422 may be sent from the base station devices 402 and 406 to the mobile devices 404 and 408 respectively and the downlink or uplink grants can be sent for the mobile devices 404 and 408 to transmit simultaneously on the uplink. Since the Reuse-1 transmissions are from nodes of the same operator the interference can be managed using CSI measurements and reports and is expected to be significantly less of a factor than interference in the case of transmissions from nodes not part of the same network. Coordination of LBT parameters between gNBs may be done over the X2 interface.

Multi-cell coordination is useful when nearby cells are deployed by the same operator and interfering transmissions from other sources (e.g. other operators) may be absent on a long term basis. In this case, the overhead of LBT can be reduced or eliminated through spectrum reuse (e.g. reuse 1 420 and 422) for transmissions from the same operator, without requiring global coordination of transmissions via backhaul signaling.

In FIG. 4, both base station device 402 and base station device 406 send LBT triggers to their connected UEs, mobile device 404 and 408 respectively, in order to align their CCA durations and LBT parameters. After the CCA, the mobile devices 404 and 408 provide feedback of the LBT status to the serving base stations via CCA reports 416 and 412. Depending on whether any transmissions of other nodes were detected the base station devices 402 and 406 can independently decide which UEs to schedule. However if the channel was detected to be clear by UEs of different cells, Reuse-1 transmissions 420 and 422 may be sent from the base station devices 402 and 406 to the mobile devices 404 and 408 in the DL or UL grants can be sent for the mobile devices 404 and 408 to transmit simultaneously on the UL. Since the Reuse-1 transmissions 420 and 422 are from nodes of the same operator the interference can be managed using CSI measurements and reports and is expected to be significantly less of a factor than interference in the case of transmissions from nodes not part of the same network.

Figure 5:
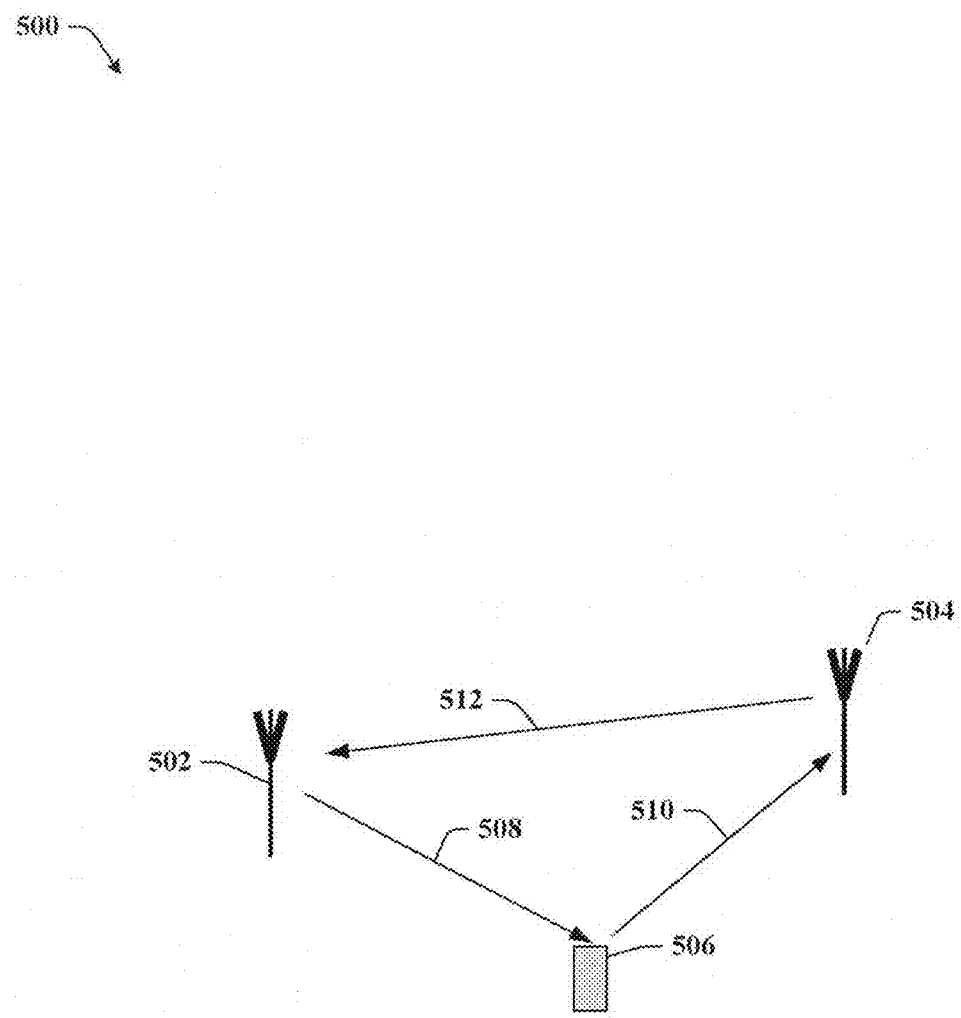
FIG. 5 illustrates an example block diagram of a dual connectivity closed loop listen before talk system in accordance with various aspects and embodiments of the subject disclosure.

Turning now to FIG. 5, illustrated is an example block diagram 500 of a dual connectivity closed loop listen before talk system in accordance with various aspects and embodiments of the subject disclosure.

NR can be deployed as a standalone (SA) radio access technology or as a non-standalone (NSA) radio access technology assisted by another radio access technology. In one example LTE can be used as a mobility anchor comprising a master cell group (MCG) base station device 504, while NR-U is used as a secondary cell group (e.g., base station device 502). The Closed-Loop LBT triggers and feedback messages are carried on the MCG while the sensing and data transmissions are carried on the SCG NR-U carriers. The coordination of LBT parameters and status may be provided via backhaul or over the air signaling (e.g., message 5012) between the LTE master node 504 and the NR-U secondary node 502 as shown in FIG. 5. The target transmission 508 can be sent to the mobile device 506 when then provides CCA/LBT feedback 510 to the master cell group base station device 504.

Figure 6:
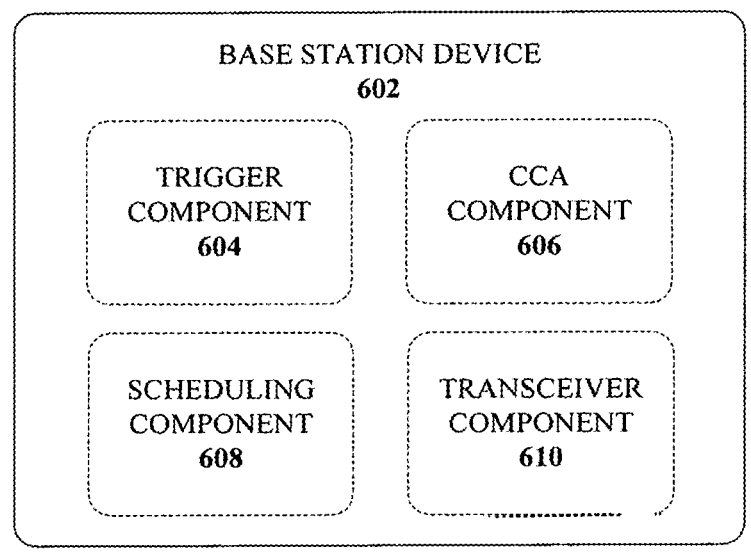
FIG. 6 illustrates an example block diagram of a base station device configured to perform closed loop listen before talk in accordance with various aspects and embodiments of the subject disclosure.

Turning now to FIG. 6, illustrated is an example block diagram 600 of a base station device 602 configured to perform closed loop listen before talk in accordance with various aspects and embodiments of the subject disclosure.

Base station device 602 can include a trigger component 604 that can facilitate issuing a first listen before talk trigger to a first mobile device via a downlink control channel, the first listen before talk trigger comprising an instruction to the first mobile device to perform a first clear channel assessment of a channel at a defined time. The transceiver component 610 can transmit the trigger on a downlink control channel to the mobile device.

A CCA component 606 can then perform the CCA at the base station device 602 at the same time as the base station device 602 requested the mobile device perform the CCA. The transceiver component 610 can then receive a result of the mobile device's CCA report via an uplink control channel. The scheduling component 608 can then in response to the first result of the first clear channel assessment and a second result of the second clear channel assessment indicating that the channel is clear, schedule a first transmission to the first mobile device via the channel.

Figure 7:
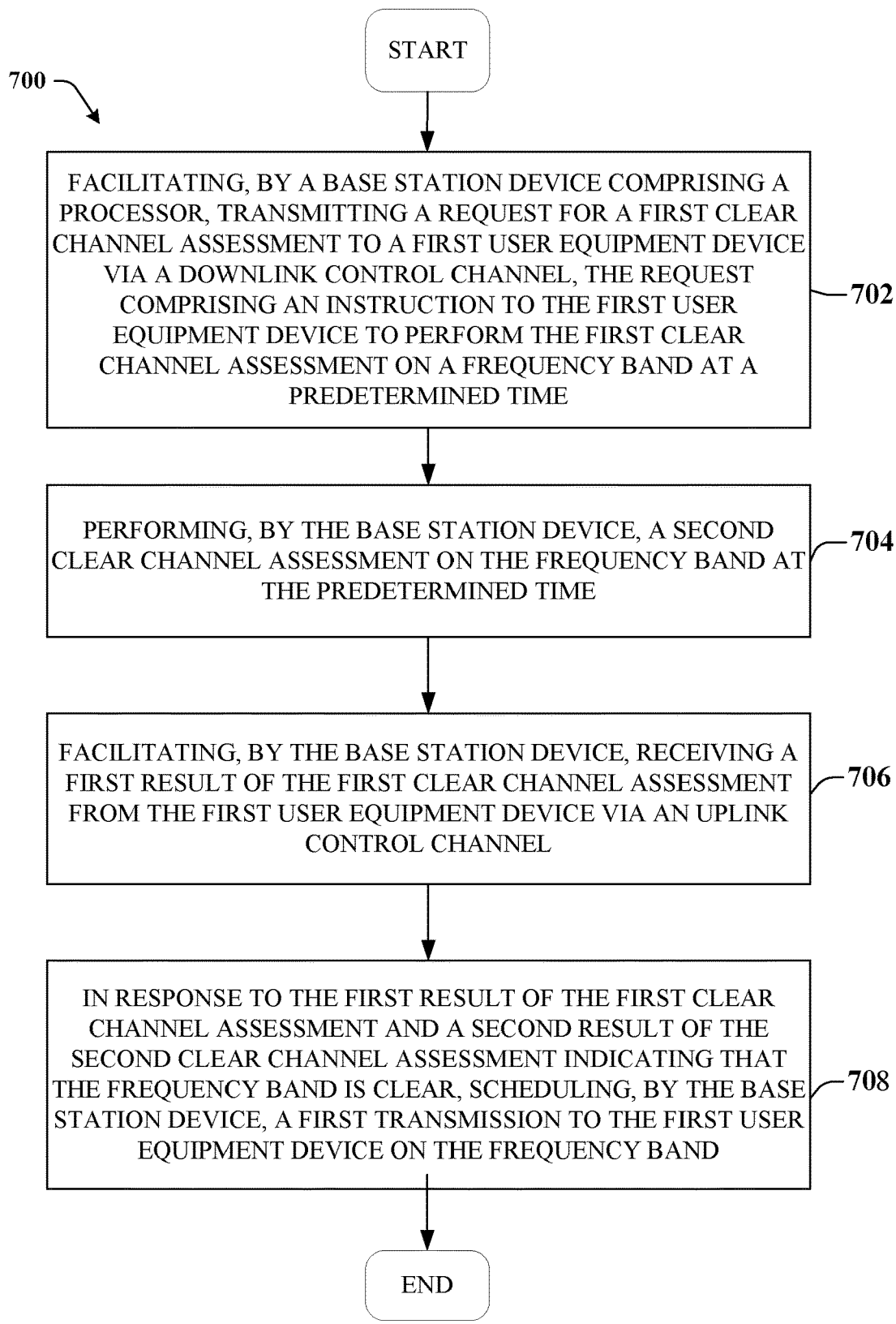
FIG. 7 illustrates an example method for performing closed loop listen before talk in accordance with various aspects and embodiments of the subject disclosure.
Figure 8:
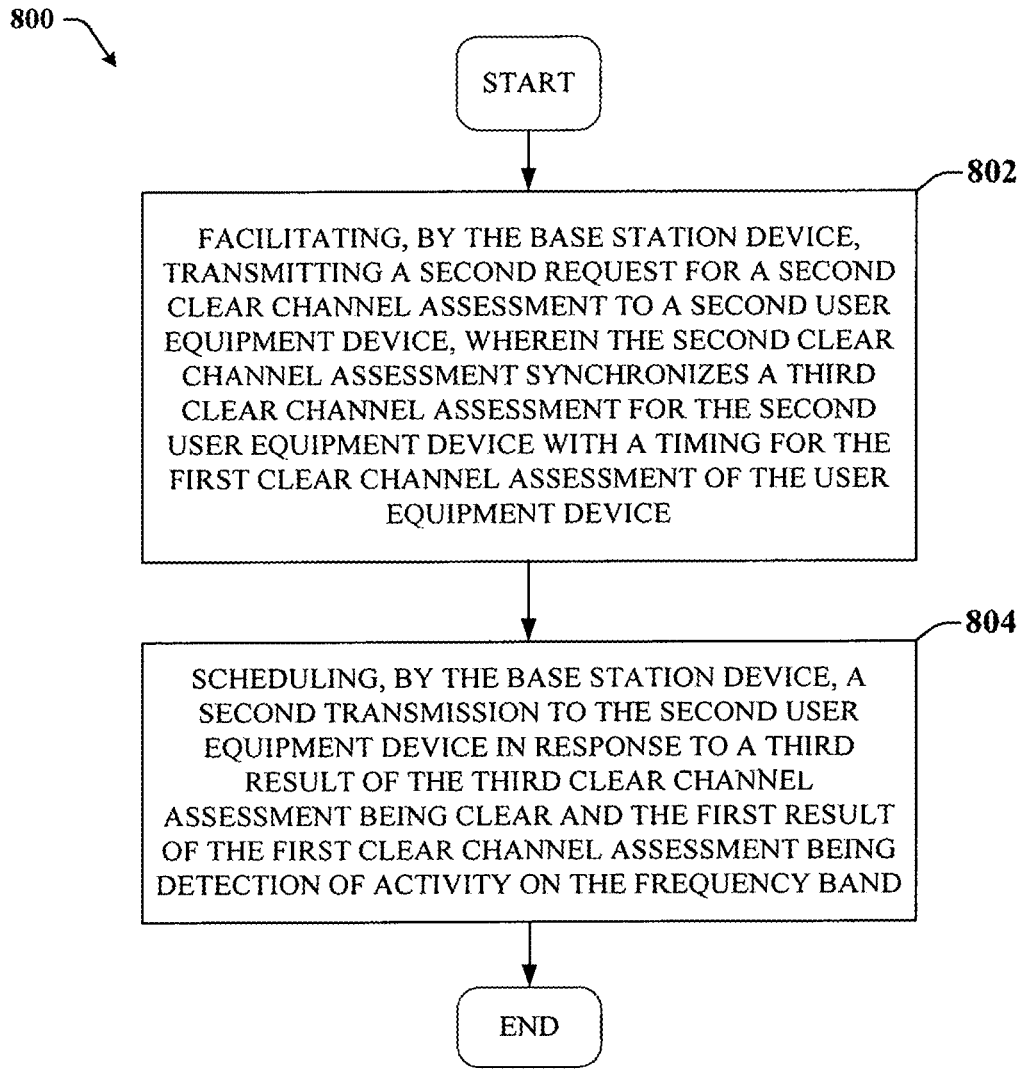
FIG. 8 illustrates an example method for performing closed loop listen before talk in accordance with various aspects and embodiments of the subject disclosure.

FIGS. 7-8 illustrates a process in connection with the aforementioned systems. The processes in FIGS. 7-8 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates an example method 700 performing closed loop listen before talk in accordance with various aspects and embodiments of the subject disclosure.

Method 700 can begin at 702 where the method includes facilitating, by a base station device comprising a processor, transmitting a request for a first clear channel assessment to a first user equipment device via a downlink control channel, the request comprising an instruction to the first user equipment device to perform the first clear channel assessment on a frequency band at a predetermined time.

At 704, the method includes performing, by the base station device, a second clear channel assessment on the frequency band at the predetermined time.

At 706, the method includes facilitating, by the base station device, receiving a first result of the first clear channel assessment from the first user equipment device via an uplink control channel.

At 708, the method includes in response to the first result of the first clear channel assessment and a second result of the second clear channel assessment indicating that the frequency band is clear, scheduling, by the base station device, a first transmission to the first user equipment device on the frequency band.

FIG. 8 illustrates an example method 800 performing closed loop listen before talk in accordance with various aspects and embodiments of the subject disclosure.

Method 800 can begin at 802 wherein the method includes facilitating, by the base station device, transmitting a second request for a second clear channel assessment to a second user equipment device, wherein the second clear channel assessment synchronizes a third clear channel assessment for the second user equipment device with a timing for the first clear channel assessment of the user equipment device.

At 804, the method can include scheduling, by the base station device, a second transmission to the second user equipment device in response to a third result of the third clear channel assessment being clear and the first result of the first clear channel assessment being detection of activity on the frequency band.

Figure 9:
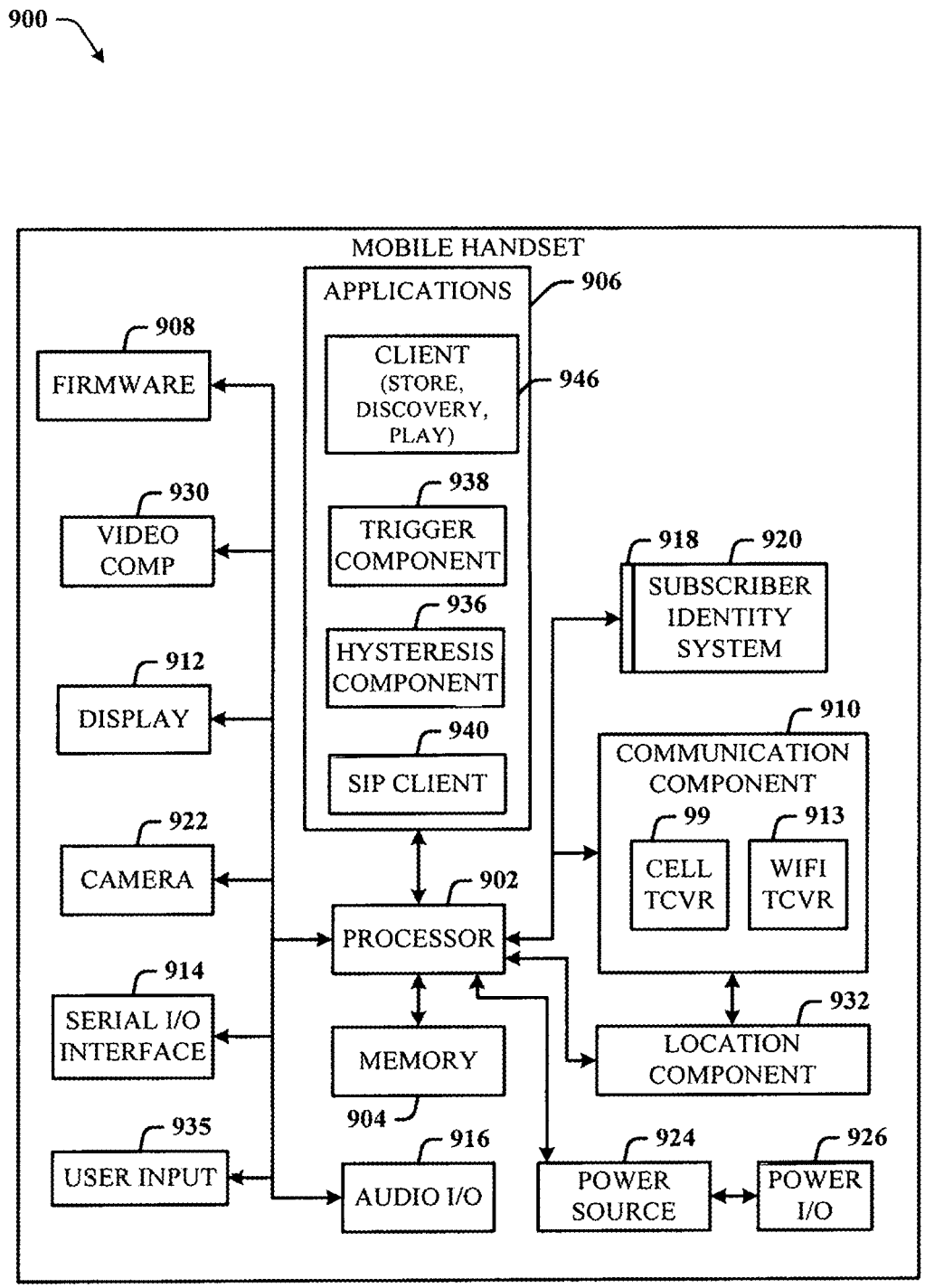
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
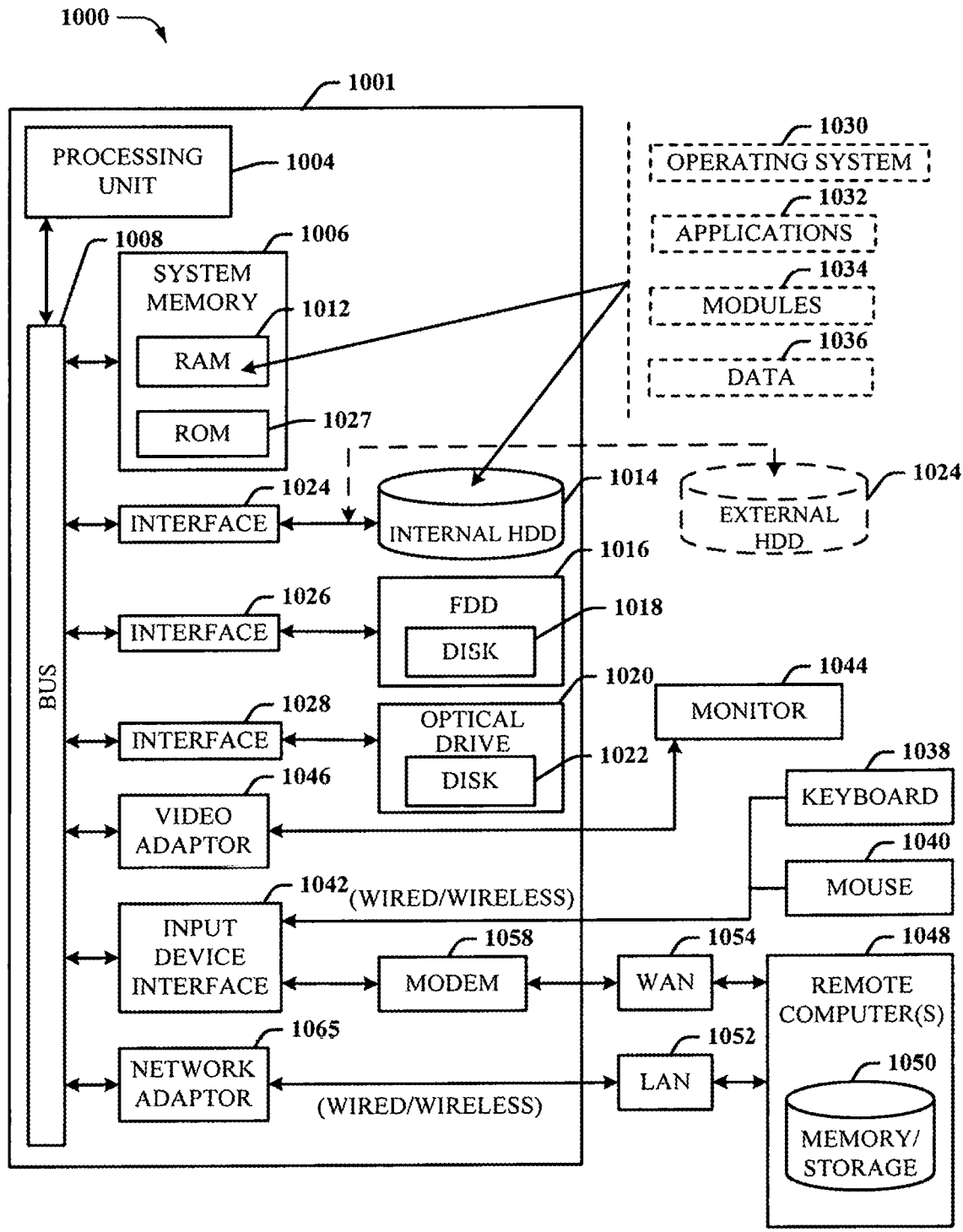
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 106, base station device 202, 204, e.g.,) may contain components as described in FIG. 10. The computer 1000 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A base station device, comprising:
a processor; and
a memory that stores executable instructions that, when executed by the processor, facilitate performance of operations, comprising:
facilitating transmitting a first listen before talk trigger to a first mobile device via a downlink control channel, the first listen before talk trigger comprising an instruction to the first mobile device to perform a first clear channel assessment of a channel at a defined time, wherein the facilitating the transmitting of the first listen before talk trigger comprises:
in response to a listen before talk duration associated with the first clear channel assessment being less than a length of a slot of the downlink control channel, facilitating the transmitting of the first listen before talk trigger to the first mobile device in a mini-slot within a duration of a first slot of the downlink control channel in which the first clear channel assessment will occur, and
in response to the listen before talk duration associated with the first clear channel assessment not being less than the length of the slot of the downlink control channel, facilitating the transmitting of the first listen before talk trigger to the first mobile device in a second slot prior to the first slot, wherein the first listen before talk trigger indicates the first slot as associated with the defined time;
performing a second clear channel assessment of the channel at the defined time;
receiving a first result of the first clear channel assessment from the first mobile device via an uplink control channel; and
in response to the first result of the first clear channel assessment and a second result of the second clear channel assessment indicating that the channel is clear, scheduling a first transmission to the first mobile device via the channel.

2. The base station device of claim 1, wherein the first clear channel assessment and the second clear channel assessment are performed on an unlicensed frequency band, and the uplink control channel and the downlink control channel uses a licensed frequency band.

3. The base station device of claim 1, wherein the first result is received in another mini-slot within the duration of the slot of the downlink control channel in response to the listen before talk duration being less than the length of the slot.

4. The base station device of claim 1, wherein the first result of the first clear channel assessment further comprises information associated with a duration of the first clear channel assessment, a channel occupied indication, and a signal strength measurement.

5. The base station device of claim 1, wherein the operations further comprise:
in response to the first result of the first clear channel assessment or the second result of the second clear channel assessment indicating that activity has been detected on the channel, facilitating transmitting a second listen before talk trigger to the first mobile device.

6. The base station device of claim 1, wherein the operations further comprise:
facilitating transmitting a second listen before talk trigger to a second mobile device, wherein the second listen before talk trigger aligns a first timing of a third clear channel assessment for the second mobile device with a second timing for the first clear channel assessment of the first mobile device.

7. The base station device of claim 6, wherein the operations further comprise:
scheduling a second transmission to the second mobile device in response to a third result of the third clear channel assessment indicating the channel is clear and the first result of the first clear channel assessment indicating activity has been detected on the channel.

8. The base station device of claim 1, wherein the base station device is a first base station device, and wherein the operations further comprise:
  synchronizing a third clear channel assessment performed by a second base station device with the first clear channel assessment and the second clear channel assessment.

9. The base station device of claim 8, wherein the second base station device is within range of the first mobile device.

10. The base station device of claim 8, wherein the synchronizing is performed via a network device of a backhaul network.

11. The base station device of claim 1, wherein the channel comprises a group of beams, and the first clear channel assessment or the second clear channel assessment determines that a first beam of the channel is clear and that a second beam of the channel is not clear.

12. The base station device of claim 11, wherein the operations further comprise:
  scheduling a time division duplex transmission on the first beam of the channel.

13. A method, comprising:
  facilitating, by a base station device comprising a processor, transmitting a request for a first clear channel assessment to a first user equipment device via a downlink control channel, the request comprising an instruction to the first user equipment device to perform the first clear channel assessment on a frequency band at a predetermined time, wherein the facilitating the transmitting of the request comprises:
    in response to a listen before talk duration associated with the first clear channel assessment being less than a length of a slot of the downlink control channel, facilitating the transmitting of the request to the first user equipment device in a mini-slot within a duration of a first slot of the downlink control channel in which the first clear channel assessment will occur, and
    in response to the listen before talk duration associated with the first clear channel assessment not being less than the length of the slot of the downlink control channel, facilitating the transmitting of the request to the first user equipment device in a second slot prior to the first slot, wherein the first listen before talk trigger indicates the first slot as associated with the predetermined time;
  performing, by the base station device, a second clear channel assessment on the frequency band at the predetermined time;
  facilitating, by the base station device, receiving a first result of the first clear channel assessment from the first user equipment device via an uplink control channel; and
  in response to the first result of the first clear channel assessment and a second result of the second clear channel assessment indicating that the frequency band is clear, scheduling, by the base station device, a first transmission to the first user equipment device on the frequency band.

14. The method of claim 13, wherein the request is a first request, and further comprising:
  in response to the first result of the first clear channel assessment or the second result of the second clear channel assessment indicating that activity has been detected on the frequency band, sending another request for the second clear channel assessment to the first user equipment device.

15. The method of claim 13, wherein the frequency band is subject to a dynamic frequency selection regulation.

16. The method of claim 13, wherein the request is a first request, and further comprising:
  facilitating, by the base station device, transmitting a second request for a second clear channel assessment to a second user equipment device, wherein the second clear channel assessment synchronizes a third clear channel assessment for the second user equipment device with a timing for the first clear channel assessment of the user equipment device.

17. The method of claim 16, further comprising:
  scheduling, by the base station device, a second transmission to the second user equipment device in response to a third result of the third clear channel assessment being clear and the first result of the first clear channel assessment being that activity has been detected on the frequency band.

18. A machine-readable storage medium, comprising executable instructions that, when executed by a processor of a device, facilitate performance of operations, comprising:
  transmitting a first listen before talk trigger to a first mobile device via a downlink control channel, the first listen before talk trigger comprising an instruction to the first mobile device to perform a first clear channel assessment of a channel at a defined time, wherein the transmitting of the first listen before talk trigger comprises:
    in response to a listen before talk duration being less than a length of a slot of the downlink control channel, facilitating the transmitting of the first listen before talk trigger to the first mobile device in a mini-slot within a duration of a first slot of the downlink control channel in which the first clear channel assessment will occur, and
    in response to a listen before talk duration associated with the first clear channel assessment not being less than the length of the slot of the downlink control channel, facilitating the transmitting of the first listen before talk trigger to the first mobile device in a second slot prior to the first slot, wherein the first listen before talk trigger indicates the first slot as associated with the defined time;
  performing a second clear channel assessment of the channel at the defined time;
  receiving a result of the first clear channel assessment from the first mobile device via an uplink control channel; and
  in response to the first clear channel assessment and the second clear channel assessment having determined that the channel is clear, scheduling a first transmission to the first mobile device via the channel.

19. The machine-readable storage medium of claim 18, wherein the first clear channel assessment and the second clear channel assessment are performed on an unlicensed frequency band, and wherein the uplink control channel and the downlink control channel operate on a licensed frequency band.

20. The machine-readable storage medium of claim 18, wherein the result of the first clear channel assessment comprises information associated with a duration of the first clear channel assessment, a channel occupied indication, and a signal strength measurement.

* * * * *